(12) United States Patent
Maeuser

(10) Patent No.: US 8,022,333 B2
(45) Date of Patent: Sep. 20, 2011

(54) SUBSTRATE WITH ELECTROCONDUCTIVE COATING AND A COMMUNICATION WINDOW

(75) Inventor: Helmut Maeuser, Herzogenrath (DE)

(73) Assignee: Saint-Gobain Glass France, Courbevoie (FR)

( * ) Notice: Subject to any disclaimer, the term of this patent is extended or adjusted under 35 U.S.C. 154(b) by 959 days.

(21) Appl. No.: 10/565,677

(22) PCT Filed: Jul. 23, 2004

(86) PCT No.: PCT/FR2004/001978
§ 371 (c)(1),
(2), (4) Date: Oct. 26, 2006

(87) PCT Pub. No.: WO2005/011052
PCT Pub. Date: Feb. 3, 2005

(65) Prior Publication Data
US 2007/0187382 A1 Aug. 16, 2007

(30) Foreign Application Priority Data
Jul. 24, 2003 (DE) ................... 103 33 618

(51) Int. Cl.
*B60L 1/02* (2006.01)
(52) U.S. Cl. .............. 219/203; 219/522; 52/171.2
(58) Field of Classification Search .......... 219/203, 219/522, 543, 541; 52/171.2; 338/306–308; 343/713
See application file for complete search history.

(56) References Cited

U.S. PATENT DOCUMENTS

| | | | |
|---|---|---|---|
| 5,390,595 A * | 2/1995 | Cutcher | 101/128.21 |
| 5,867,129 A * | 2/1999 | Sauer | 343/713 |
| 6,352,754 B1 | 3/2002 | Frost et al. | |
| 6,356,236 B1 * | 3/2002 | Maeuser et al. | 343/713 |
| 6,559,419 B1 * | 5/2003 | Sol et al. | 219/203 |
| 6,765,177 B2 * | 7/2004 | Noguchi et al. | 219/203 |

FOREIGN PATENT DOCUMENTS

| | | |
|---|---|---|
| EP | 0 717 459 | 6/1996 |
| EP | 1 422 784 | 5/2004 |
| WO | 00/72634 | 11/2000 |
| WO | 01/68395 | 9/2001 |
| WO | 2004-037737 | 5/2004 |

* cited by examiner

Primary Examiner — Geoffrey S Evans
Assistant Examiner — Vinod D Patel
(74) Attorney, Agent, or Firm — Oblon, Spivak, McClelland, Maier & Neustadt, L.L.P.

(57) ABSTRACT

The invention is aimed at a substrate, in particular window pane, with an electrically conducting and heatable coating, at least one communication window made in the latter in the form of an interruption of said coating, the window being able to allow communication radiation used as signal carrying information to be transmitted therethrough and whose wavelength lies in a span of wavelengths that can be reflected or absorbed by the coating, and another electrically conducting element in contact with at least one part of edges of the window and in contact with the coating, characterized in that the communication window is provided with an electrically conducting covering and linked electrically to the other electrically conducting element.

21 Claims, 1 Drawing Sheet

SUBSTRATE WITH ELECTROCONDUCTIVE COATING AND A COMMUNICATION WINDOW

BACKGROUND OF THE INVENTION

1. Field of the Invention

The invention pertains to a coated substrate, preferably transparent, with a communication window allowing information to be transmitted therethrough.

2. Description of the Related Art

Patent DE 195 03 892 C1 discloses measures for reducing the shielding of coated panes in regard to microwave rays transmitting information. Such panes with electrically conducting and optically transparent coatings find their application as thermal insulation panes reflecting infrared rays (IR) and/or as electrical heating panes both for the glazing of buildings and for the glazing of vehicles.

In vehicles, they form together with a metal bodywork a Faraday cage, which protects the interior space of the vehicle against electromagnetic fields. In construction aloft also, premises can be protected electrically through the use of panes with an electrically conducting coating and a corresponding electrically conducting structure of the other walls. With shieldings of this nature, sensitive apparatus such as control computers can be protected, in the region of construction, against the disturbing influences due to radiophonic emitters or to radar installations of large power.

Moreover, neither does the shielding allow through electromagnetic radiation in the microwave region, which is used as carrier wave for information. If an emitter and/or a receiver is situated alongside the antenna in a protected (vehicle) space, transmission problems occur. For example, systems for determining the position of the vehicles, for remote control, for identification, for fixing tolls, or the like are disturbed.

It is known for systems of layers to be structured a posteriori, mechanically or thermally, by removing lines of the layer deposited initially in a continuous manner. In particular, extraordinarily narrow slots can be produced in the layer with laser rays. In the aforesaid state of the art, there is devised as remedy in the electrically conducting layer at least one slot forming a radiating slot, with a length tuned to the wavelength of the microwave radiation and a very small free surface area, through which the energy radiating in the microwave range picked up by the conducting layer can again be decoupled. A so called communication window is thus formed.

If the working frequency for the transmission of information equals for example 5.8 GHz, as is envisaged for the automatic fixing of tolls on motorways ("remote payment") (DSRC standard with a mean frequency of 5.8 GHz with circular polarization) and if the slots are provided mainly for the transmission of the microwaves of this frequency, they will be appropriately designed for the resonant length of $\lambda/2$, taking account of the dielectric constants of the glass.

Should the information be transmitted with circularly polarized microwaves (that is to say the instantaneous plane of oscillation of the waves rotates about its axis of propagation, so that the waves oscillate inside a circular envelope curve), appropriate provision is made for gaps in the form of cruciform slots in the layer. The length of the two slots is again tuned in an appropriate manner to the wavelength of the microwaves used and corresponds to the value $\mu/2$ of the microwaves used, taking account in a corresponding manner of the dielectric constants of the glass.

Comparative measurements of the damping of a microwave radiation of frequency 5.8 GHz indicate, in this state of the art, that with a laminated pane exhibiting radiating slots in the coating, appreciably weaker damping of transmission, for high frequency radiation, is obtained than with a fully coated laminated pane, and that it is possible to approach the damping of an uncoated laminated pane.

Document DE 198 17 712 C1 describes a similar substrate with a communication window in a coating, which is produced by the creation of a structure in the form of fine lines or fine patterns in a limited part of the surface of the coating and which is visually very discreet.

The formation of resonating structures in the conducting coating poses problems however. Results of trials have shown that the high frequency currents necessary for compensation, in the overall system formed by the dielectric substrate and the conducting coating, were not able to flow on account of the high surface resistance or of loss of the usual conducting coatings.

Document WO 00/72635 A1 describes a transparent substrate with a coating that reflects IR and a communication window made by the surface removal or the omission of the coating. In contradistinction to communication windows made solely in the form of fine lines, discussed in the introduction, this variant forms a disturbance of the coating which is markedly perceptible to the eye through a difference in color at the boundary of the coating.

This disturbance poses a problem in particular, when the coating is used at the same time for the electrical heating of the substrate. For this purpose, a voltage is applied to the coating with the aid of at least one pair of electrodes (in the form of bands), the currents having to be introduced and distributed as uniformly as possible in the surface of the layer. For vehicle panes, which are appreciably wider than high, most of the time the band shaped electrodes are situated along the longer sides of the pane, so that the heating current can flow over the shortest path over the height of the pane. At the same time, the communication windows are situated on the upper rim of the pane and here extend over a width of several centimeters.

Manifestly, each communication window affecting the homogeneity of the coating forms a disturbance of the current flow. Local temperature spikes ("hot spots") appear which may lead to damage to the substrate (thermal stresses) and to the coating itself. This is not only the case when the coating is of large extent, but also when the communication window is formed by a larger or smaller number of discontinuous individual slots. The latter also form in the zone of the surface considered an appreciable increase in the resistance of the layer and also in addition cause the appearance of the hot spots mentioned above.

The document cited last proposes, as a measure aimed at reducing the disturbing effect of the large communication window, that provision be made on the edge of the latter for an electrically conducting band, which exhibits a much smaller ohmic resistance per unit area than the heating layer. This ought to cause the currents to bypass the cut-out. Preferably, a communication window is entirely flanked by such a band. The band may be fabricated by printing and baking a conducting silk screen printing paste, containing silver. It may, however, also be applied by depositing an electrically conducting lacquer or by laying a metallic band. In all cases, an electrically conducting functional bond is naturally necessary between the band and the coating.

The band may be masked from view by the superposition of an electrically nonconducting, opaque masking band, made for example of black enamel. Such masking bands are as a general rule composed of a nonconducting substance, black in color, which may be baked (silk screen printing paste). An infrared radiation is not reflected, but absorbed, by this substance.

SUMMARY OF THE INVENTION

The problem underlying the invention is to procure a more improved substrate with a heatable coating and a communication window made in the latter.

One embodiment of the invention includes a substrate, in particular window pane, with an electrically conducting and heatable coating, at least one communication window made in the latter in the form of an interruption of said coating, the window being able to allow communication radiation used as signal carrying information to be transmitted therethrough and whose wavelength lies in a span of wavelengths that can be reflected or absorbed by the coating, and an electrically conducting element in contact with at least one part of edges of the window and in contact with the coating, the communication window being provided with an electrically conducting covering linked electrically to said electrically conducting element.

BRIEF DESCRIPTION OF THE DRAWINGS

Other details and advantages of the subject of the invention will become apparent through the drawings in which.

DETAILED DESCRIPTION OF THE PREFERRED EMBODIMENTS

Figure 1:
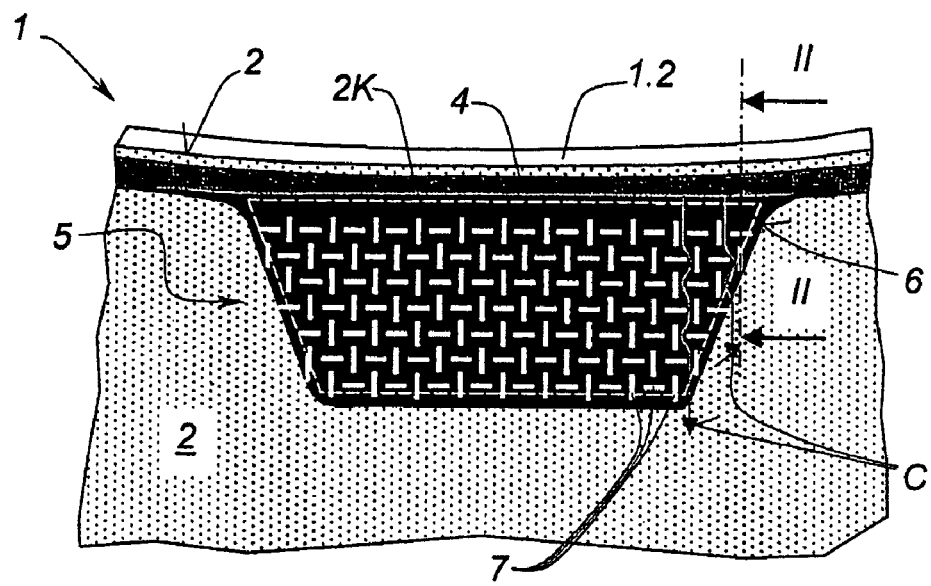
FIG. 1 is a partial view of a vehicle windshield coated with a communication window provided in the coating and a conducting covering on top of the window.

In one embodiment of the present invention, a substrate, in particular window pane, has an electrically conducting and heatable coating, at least one communication window made in the coating in the form of an interruption. The window allows communication radiation used as signal carrying information to be transmitted therethrough and whose wavelength lies in a span of wavelengths that can be reflected or absorbed by the coating. On account of the fact that the communication window, hence a zone of the surface not coated with the heatable coating which preferably reflects IR, is provided with a covering according to the invention which is itself electrically conducting (permeable to DC current), which is in its turn in electrically conducting bonding with the coating directly or by way of another electrically conducting element, currents (for heating) can flow in this zone. The covering forms an electrical bypass or a bridge. The covering may be produced before or after depositing the coating on the substrate.

In an advantageous embodiment, which is simple to embody, the covering is deposited on the coating in such a way that it covers on all the sides the edges of the communication window without coating and furthermore comprises said other electrically conducting element. Preferably, the covering may exhibit a lower ohmic resistance per unit surface area than the ohmic resistance per unit surface area of said coating. The coating can be energized and hence heated by an electrical voltage by means of at least two electrodes, the electrically conducting covering is situated in the current flow between the electrodes. The covering can also be heated in the form of resistance heating. The covering is able to allow through the communication radiation to be transmitted through the communication window or which only weakly attenuates said radiation.

Interruptions can advantageously be made in the covering, which increase its permeability to said communication radiation through the communication window but which do not however prevent current flow through the covering.

According to a preferred refinement of the invention, appropriate resonant structures are created in the covering in the form of openings or interruptions, the dimensions of which may be tuned in a manner known per se to the characteristics of the communication radiation (frequency, wavelength, polarization, etc).

The problem mentioned above, relating to overly weak compensation currents, manifests itself in a markedly less pronounced manner with coverings according to the invention, in particular when the latter have a substantially better conductivity (not as large a surface resistance) than the substance of the coating.

If the openings or interruptions in the covering are fabricated with as small a surface area as possible, no appreciable limitation can be discerned nor any interruption in the current paths in the covering, despite the proven good effect on the transmission of the wavelengths considered here, because "dead" zones between the interruptions may be avoided or even entirely eliminated. It has been possible to confirm this situation with the aid of thermographs of experimental samples.

In a very preferred manner, the dimensions of the openings in the covering are tuned to the wavelength(s) of the communication radiation.

Given that the covering is preferably interrupted only locally, so as not to disturb its general electrical conductivity, only slots enter into the reckoning as opening structures. These slot structures are disposed as a field in the zone of the covering.

The interruptions may preferably be formed in various directions, in particular perpendicularly to one another, in particular if a communication radiation exhibiting circular polarization is transmitted.

Structures such as polygons, ellipses and circles as well as crosses may be chosen. Structures of polygons or of ellipses which are by nature closed may however form passive "islets" of surface in the covering, on whose edges hot spots may again form.

A more advantageous embodiment would be a cross, which is composed of four equal branches with a length ($\lambda/4$) corresponding to a quarter of the wavelength of the radiation considered. Each of the four slots forms a slot antenna. It is open on one side and is shortened by half the length of the perpendicular slot. Moreover, it receives a capacitive load via the dispersion fields in the perpendicular slot, that is to say it is extended.

For the length of the individual slots, this results to a first approximation in a resonator shortened by half the width of the slot. The resonant frequency of the cross shaped slot is therefore equal to the resonant frequency of a simple slot, shortened by half its own width.

The horizontal and vertical distance of individual structures with respect to one another may preferably be less than the wavelength $\lambda$. The slot width may preferably be $\lambda/10$. For example, taking into consideration the parameters of the materials, the permittivity and the loss factor of the glass material and adhesive film material (PVB for example) in the laminated glass, the following theoretically optimal dimensions result: height and width of the crosses 11.5 mm, slot width 0.5 mm, distance of the centers of the crosses 15 mm.

With a tight layout such as this of the crosses in lines, only covering portions of around 3.5 mm wide would however remain between the extremities of two arms of crosses. These portions may again form constrictions for the current flow, and hot spots may again appear.

To limit these constrictions, the cross structure may be replaced with a periodic structure composed of individual slots disposed in lines, alternately perpendicular with respect to one another. The optimal length for resonating slot structures corresponds to half the wavelength ($\lambda_{cl}/2$) of the radiation considered with a frequency of 5.8 GHz, with $\lambda_{cl}=c/(f*\sqrt{\in_r})$ and the dielectric constant $\in_r$ of a laminated pane equals around 4.7. In the present exemplary embodiment, resonating structures therefore have a length of around 12 mm.

Other frequencies and other wavelengths as well as other substrates would lead to different values.

Preferably, the covering may be manufactured by printing, in particular by silk-screen printing of an electrically conducting ink. This fabrication procedure may be integrated as far as possible into the established process for producing the substrates considered, in particular vehicle windshields, since the windshields are mostly already provided with patterns or bands by silk screen printing.

The sheet resistance of the printing agent used as covering may preferably be less than 2 ohms/square. The latter value is a typical value for the surface resistance of an electrically conducting transparent coating.

Provision may be made for at least two electrodes in the form of bands, applied by printing, in particular by silk-screen printing, so as to introduce a heating voltage into the coating.

The covering and the electrodes may be composed of the same substance and may preferably be printed in a single operation.

Good transmission results were obtained with a slot width of 1 mm.

As an example, the horizontal and vertical distances of the slots with respect to one another equaled 12.75 mm. For the experimental fabrication of the covering, a black silver paste DR 08 03 was employed (a glassy enamel for baking, manufactured by Ferro). After baking, this paste had a sheet resistance of around 15 m$\Omega$/square. Its thickness is preferably in the range 8-15 µm. With the aid of thermographs, it is clearly apparent that no notable hot spot occurred and that no notable surface heating power was provided in the zone of the covering. Sinuous current paths form, which have a sufficiently constant width everywhere, so as to avoid local overheating.

An advantageous technological objective of the invention is to achieve, in the zone of the communication window, a transmission that is comparable to normal laminated panes (2-4 dB damping) for the communication radiation, and is already achieved in this way.

This objective has a higher priority than the heating of the pane in the zone of the communication window, which anyway is not transparent, or which is only partially so, on account of the covering.

If the region of the covering nevertheless contributes to the heating of the surface, for example to obtain a more homogenous distribution of heat in the substrate, the covering is then made with a markedly larger surface resistance.

This may however be obtained through a reduction in the thickness of the deposition, a reduction in the content of conducting pigments (for example the silver content) in the silk screen printing ink, another method of deposition for the covering, via a tighter layout of the structures, this listing of measures not being exhaustive.

Conversely, a person skilled in the art may apply any measure which seems suitable to him to adapt the resistance of the covering as a function of concrete requirements, without thereby departing from the scope of the invention.

It is not absolutely necessary to use a baking type printing ink (resistant to high temperature) for the covering, since cases of application with no baking operation may be envisaged. Given that the covering is in general placed routinely in a position protected inside a laminated pane, it may in principle also be composed of mechanically less resistant substances, for example of organic conducting inks.

The electrical parameters indicated here and in what follows, like the sheet resistances, the electrical powers and the minimum transmission of light of vehicle panes are practical values. It goes without saying that they do not limit the application of the invention, but that the latter may also be used for panes exhibiting other limit values of transmission, other values of the operating voltage and (smaller) sheet resistances.

The covering may form at least in part a sun visor, preferably situated between two fold-down sun visors.

The substrate may be constituted by a laminated pane composed of a first rigid pane provided with the coating and the covering, said other electrically conducting element, an adhesive layer and a second rigid pane.

Referring now to the drawings, wherein like reference numerals designate identical or corresponding parts throughout the several views, the embodiments of the invention will be described in more detail. It is noted that the drawings are simplified representations, and are not drawn to scale.

FIG. 1 shows a part of an edge region of a laminated pane 1, which is provided with an electrically conducting coating 2, highly transparent to visible light. In the present exemplary embodiment, this coating is situated, as may be better seen in FIG. 2, inside the composite, which is composed of two transparent panes 1.1 and 1.2 as well as of an adhesive film 3 bonding them together by surface gluing. The coating 2 is here deposited directly on the pane 1.2 serving as substrate disposed inside the composite. The view of FIG. 1 is obtained when the pane 1.1 and the adhesive film 2 are mentally removed. In the windshield of a vehicle, the pane 1.2 forms the exterior pane; the pane 1.1 faces towards the interior space of the vehicle.

The coating 2 is preferably composed of a system of layers having high thermal resistance with at least one metallic layer having low ohmic resistance, preferably made of silver, as well as other layers, in particular with dielectric properties, having high optical refringence (antireflection) and, as appropriate, blocking layers. Well known systems of layers such as these may be deposited on panes in a flat position and withstand without damage the temperatures of 650° C. and above required for the subsequent cambering of the panes. The finished laminated pane preferably affords light transmission of at least 70%.

The finished system of layers has a surface resistance of around 2 to 4 $\Omega$/square. It is used as heatable coating and preferably reflects thermal rays (IR radiation). For this purpose, the laminated pane 1 is provided, in a manner known per se, with at least two current collecting strips on either side of the coating 2, only the upper strip, designated by the label 4, being visible here. The two current collecting strips extend in the usual manner along the upper and lower sides of the laminated pane in the fitted position. They are made by printing and baking an electrically conducting ink, in particular by silk screen printing of a paste with a high silver content. When they are subjected to an electrical voltage (DC), the DC electric current flowing between them heats the coating by resistance heating.

It may be seen that the current collecting strip 4 is situated along the upper rim represented here on the coating 2, which may already be deposited before the printing of the current collecting strip. It is naturally possible also to print the collecting strip first and subsequently deposit the coating.

Figure 2:
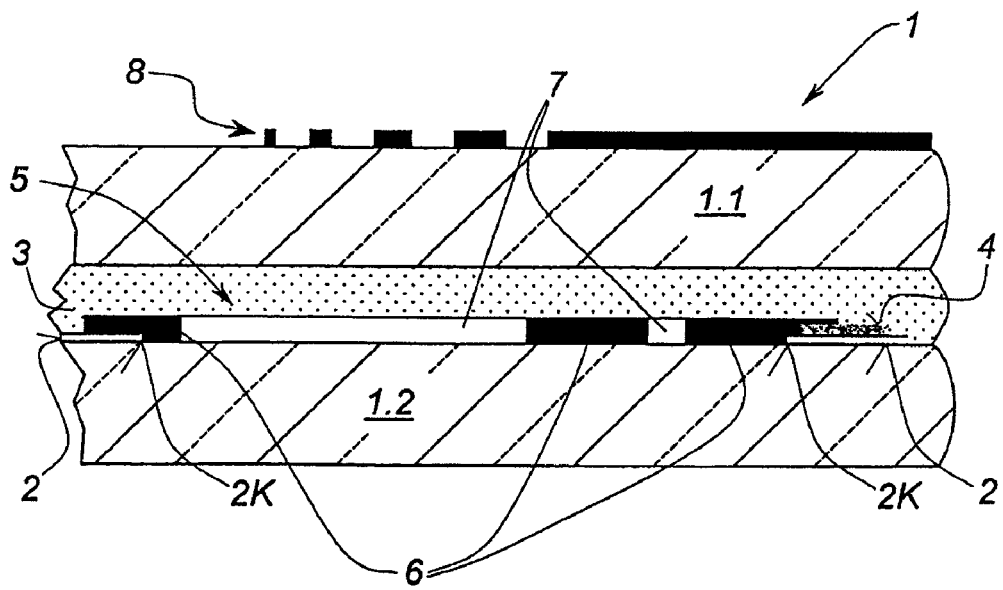
FIG. 2 is a representation in section along the line II II of FIG. 1.

The coating 2 itself is not extended as far as the exterior edge of the pane 1.2, so that corrosive attacks from the exterior are avoided as far as possible. If the pane 1.2 is cut out from an already coated blank, the coating is removed by abrasion at the periphery over a narrow band along the edge of the cut-out. In FIG. 2 it may be seen, on the right side, that the adhesive film 3 seals the coating 2 towards the exterior.

Beneath the current collecting strip 4, a superficial zone of the surface of the pane is free of coating, so as to obtain a communication window 5 of the type discussed in detail in the introduction. The coating free superficial zone, surrounded by a rim 2K (indicated by an interrupted white line) of the coating 2, may be formed for example by masking during the coating operation, or after coating, by local superficial removal of the coating 2 with appropriate means, for example by laser treatment or by abrasion. The height/width ratio of the communication window serves merely for the representation of the present exemplary embodiment. It may in reality vary to a greater or lesser extent depending on the type of pane, the fitting situation and the customer's requirements.

In accordance with the invention, the communication window 5 is provided with a covering 6, which is made here with an opaque (black) ink. This covering 6 is itself electrically conducting. It may be composed of the same substance as the current collecting strip 4, or also of another appropriate substance. In the first case, it would be possible to print the current collecting strips and the covering in a single operation, advantageous from the production technique point of view, on the pane 1.2 respectively on the coating 2. In each case, the surface ohmic resistance of the covering 6 is markedly lower than that of the coating 2.

Such a covering generally absorbs infrared radiations through the communication window 5.

A pattern composed of openings 7 is thereupon made in the covering 6. These could in principle be made a posteriori, after depositing an initially continuous covering on the surface. If the covering is however made by silk screen printing, then the silk screen printing stencil will be manufactured in such a way that the openings 7 are produced in the covering 6 at the same time as the printing operation.

In the present example, the openings 7 are made in the manner described above, in the form of a regular pattern composed of slots of like length and of like width that are oriented alternately in the horizontal direction and in the vertical direction (perpendicular to one another). This arrangement lends itself well to the passage of circularly polarized waves in the zone of the communication window.

Of course, other arrangements of slots may be more advantageous for other types of waves or radiations.

In the present exemplary embodiment, the slots could, with the same effect, be oblique instead of being vertical and horizontal, provided that they alternate perpendicularly to one another. The widths and the lengths of the slots are not to scale, in particular real slot antennas are markedly narrower with respect to the total surface area of the communication window 5.

In all cases, the openings 7 are disposed in such a way that, between the current collecting strip 4 and the coating 2/the rim 2K, there are still direct current paths through the covering 6 having low ohmic resistance by comparison with the coating 2. In the region of the cut line II-II, arrows have been used to symbolically indicate sinuous current paths C snaking around the slots 7, which naturally cannot reproduce the real current flows.

Additionally, in numerous vehicle windshields, there is provided, in the region situated between the fold down sun visors, a "third sun visor" in the form of an opaque covering having a dot motif (see document DE 40 33 188 A1). This covering is in general situated on the surface of these panes that faces towards the interior space of the vehicle, and it has absolutely no electrical role.

The communication window 5 may be disposed in a vehicle windshield at around the middle of the upper rim (as is widespread in contemporary vehicles), the covering 6 may then afford the additional function of "third sun visor" in which case it then exhibits, in contradistinction to the aforesaid solution, a continuous structure which allows the current to flow and it is furthermore disposed in another plane of the laminated pane.

In FIG. 2, the thicknesses of the coating 2 (in reality a few nanometers), of the adhesive film 3 (for example 0.38 mm) and of the covering 6 (a few μm) are greatly exaggerated, not to scale, for reasons of clarity, with respect to the thicknesses of the rigid panes 1.1 and 1.2.

It may be seen that the current collecting strip 4 is deposited on the coating 2, and that the covering 6 for its part covers the edges of the gap in the coating forming the communication window. The covering 6 electrically spans the gap in the coating 2. Hence, hot spots no longer occur.

The adhesive film 3 which melts during the process of assembling the two rigid panes will, unlike the representation, more or less fill in the slots 7. It goes without saying that the substance used for the covering just like the substance of the coating and of the current collecting strip is preferably compatible with the substance of the adhesive layer and that good adherence of the adhesive film to all the surfaces of these layers is preferably guaranteed.

A band of opaque ink 8, which transforms itself into a dot motif in the customary manner towards the middle of the pane, has also been disposed alongside the edge, on the upper exterior surface of the rigid pane 1.1. It may be disposed in a manner known per se at this location and/or on one or more of the other surfaces of the rigid panes situated inside or outside the composite, so as to mask the current collecting strip 4 from view.

Obviously, numerous modifications and variations of the present invention are possible in light of the above teachings. It is therefore to be understood that within the scope of the appended claims, the invention may be practiced otherwise than as specifically described herein.

The invention claimed is:

1. A substrate, comprising:
    an electrically conducting and heatable coating;
    at least one communication window made in the coating in the form of an interruption, the window being able to allow communication radiation used as signal carrying information to be transmitted therethrough and whose wavelength lies in a span of wavelengths that can be reflected or absorbed by the coating; and
    an electrically conducting element in contact with at least one part of edges of the window and in contact with the coating;
    wherein the communication window is provided with an electrically conducting covering electrically connected to said electrically conducting element, said covering having a plurality of interruptions in the window.

2. The substrate of claim 1, wherein the covering is deposited on the coating in such a way that it covers on all the sides the edges of the communication window and comprises said electrically conducting element.

3. The substrate of claim 2, wherein the covering has a lower ohmic resistance per unit surface area than the ohmic resistance per unit surface area of said coating.

4. The substrate of claim 2, wherein the coating can be energized and by an electrical voltage by means of at least two current collecting strips, and the electrically conducting covering is situated in the current flow between the current collecting strips.

5. The substrate of claim 2, wherein interruptions are made in the covering, which increase its permeability to said communication radiation through the communication window but which do not prevent current flow through the covering.

6. The substrate of claim 1, wherein the covering has a lower ohmic resistance per unit surface area than the ohmic resistance per unit surface area of said coating.

7. The substrate of claim 6, wherein the coating can be energized and heated by an electrical voltage by means of at least two current collecting strips, and the electrically conducting covering is situated in the current flow between the current collecting strips.

8. The substrate of claim 6, wherein interruptions are made in the covering, which increase its permeability to said communication radiation through the communication window but which do not prevent current flow through the covering.

9. The substrate of claim 1, wherein the coating can be energized and heated by an electrical voltage by means of at least two current collecting strips and the electrically conducting covering is situated in the current flow between the current collecting strips.

10. The substrate of claim 9, wherein interruptions are made in the covering, which increase its permeability to said communication radiation through the communication window but which do not prevent current flow through the covering.

11. The substrate of claim 1, wherein the covering can also be heated through resistance heating.

12. The substrate of claim 1, wherein interruptions are made in the covering, which increase its permeability to said communication radiation through the communication window but which do not prevent current flow through the covering.

13. The substrate of claim 12, wherein the interruptions in the covering comprise slot antennas tuned to said communication radiation through the communication window.

14. The substrate of claim 12, wherein the interruptions in the covering are formed perpendicularly to one another.

15. The substrate of claim 12, characterized in that the interruptions in the covering comprise crossed slots and/or slots oriented alternately perpendicularly to one another.

16. The substrate of claim 1, wherein the covering comprises printed electrically conducting ink.

17. The substrate of claim 1, comprising at least two current collecting strips in the form of printed bands for applying a heating voltage to the coating.

18. The substrate as claimed in claim 17, characterized in that the covering and the current collecting strips are composed of the same substance.

19. The substrate of claim 1, characterized in that said covering forms at least in part a sun visor.

20. The substrate of claim 1, comprising a laminated pane composed of a first rigid pane provided with the coating and the covering; a second rigid pane; and an adhesive layer disposed between the first and second rigid panes.

21. The substrate of claim 1, wherein said covering substantially covers said window.

\* \* \* \* \*